United States Patent
Hada

(10) Patent No.: US 8,548,673 B2
(45) Date of Patent: Oct. 1, 2013

(54) METHOD AND SYSTEM FOR ASSESSING VEHICLE TOLLS AS A FUNCTION OF FUEL CONSUMPTION

(75) Inventor: Hideki Hada, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 367 days.

(21) Appl. No.: 12/856,826

(22) Filed: Aug. 16, 2010

(65) Prior Publication Data

US 2012/0041670 A1   Feb. 16, 2012

(51) Int. Cl.
  *G08G 1/00*   (2006.01)
(52) U.S. Cl.
  USPC .............................................. 701/32; 705/13
(58) Field of Classification Search
  USPC ............................ 701/32; 705/13
  See application file for complete search history.

(56) References Cited

U.S. PATENT DOCUMENTS

| | | | |
|---|---|---|---|
| 6,396,418 | B2 | 5/2002 | Naito |
| 7,398,924 | B2 | 7/2008 | Dawson et al. |
| 2002/0072963 | A1 | 6/2002 | Jonge |
| 2003/0110075 | A1* | 6/2003 | Shioda et al. .................... 705/13 |
| 2009/0172181 | A1* | 7/2009 | Cheng et al. .................. 709/231 |
| 2010/0060484 | A1* | 3/2010 | Peeters et al. ................. 340/928 |

* cited by examiner

*Primary Examiner* — Mary Cheung
*Assistant Examiner* — Yuen Wong
(74) *Attorney, Agent, or Firm* — Gifford, Krass, Sprinkle, Anderson & Citkowski, P.C.

(57) ABSTRACT

A system for assessing a toll on a vehicle traveling past a toll station in which a tag mounted on the vehicle transmits an output signal having data representative of the fuel consumption of the vehicle and the identity of an account associated with the tag. A receiver at the toll station receives the output signal from the tag and provides the received data to a processor. The processor then calculates a toll which varies as a function of the data and thus of the fuel consumption of the vehicle and then assesses that toll to the account.

7 Claims, 2 Drawing Sheets

METHOD AND SYSTEM FOR ASSESSING VEHICLE TOLLS AS A FUNCTION OF FUEL CONSUMPTION

BACKGROUND OF THE INVENTION

I. Field of the Invention

The present invention relates to both a system and method for assessing road tolls on vehicles as a function of the fuel efficiency of the vehicle.

II. Description of Related Art

There are many toll roads in the United States and elsewhere and most of these use a fixed price for tolling based on the vehicle type. For example, a two axle passenger car will typically have a lower toll rate than a small commercial vehicle or a large commercial vehicle.

In order to assess a toll, many jurisdictions use electronic toll collection which is widely implemented in the United States. The system includes a tag which is attached to the vehicle windshield and which contains information relative to an account or person associated with the tag. The tag itself is self-contained thus having a battery as well as wireless communication capability. The tag does not, however, communicate with the vehicle electronic systems.

As the vehicle with the tag is driven past a tag reader at a toll station, the toll station reads the account information from the tag and then, by accessing stored data associated with that tag account number, assesses the proper toll to an account associated with the tag.

One shortcoming of these previously known electronic toll systems and the vehicle tags is that it is not possible for the toll station to identify when a tag for one type of vehicle is transferred to a different type of vehicle for which a different road toll may apply. For example, if a tag for a passenger car which enjoyed a relatively low road toll were transferred to a heavy duty truck, the heavy duty truck would be recognized by the toll reader as the passenger car and assessed a lower toll rate.

A still further disadvantage of these previously known electronic toll collection systems is that it has previously been impossible for the toll station to vary the toll rate as a function of fuel efficiency and/or fuel economy, which is directly related to the emission of carbon dioxide. However, it would be highly desirable to reward fuel efficient vehicles and thus low carbon dioxide emission as well as fuel efficient driving habits with lower road tolls.

SUMMARY OF THE PRESENT INVENTION

The present invention provides a method and system which overcomes the disadvantages of the previously known methods and systems.

In brief, the system of the present invention includes a tag mounted on a vehicle which transmits an output signal having data representative of the fuel consumption as well as the identity of an account associated with the tag. The data representative of the fuel consumption of the vehicle may include not only the type of vehicle, but also the fuel economy derived directly from the vehicle control systems. Preferably, the tag communicates with the vehicle electronic system either wirelessly, or by a direct connection with the system bus.

A receiver associated with a toll station receives the output signal from the tag and provides that data to a processor. The processor is programmed to calculate a toll which varies as a function of the data and thereafter assess the toll to the account associated with the vehicle. Preferably, the processor is programmed to assess a lower toll on fuel efficient automotive vehicles, such as hybrid and electric vehicles, and to also reward good driving habits which result in better fuel consumption by a lower road toll.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
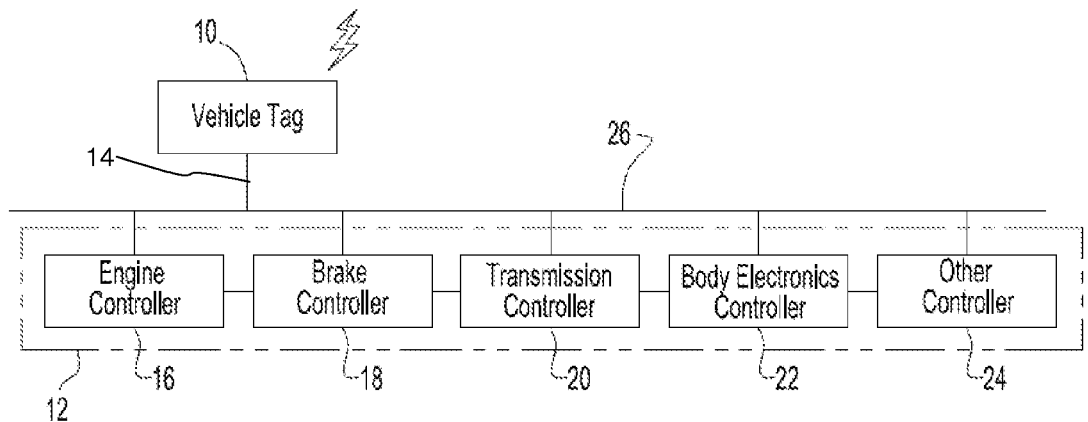
FIG. 1 is a block diagrammatic view illustrating a portion of the system of the present invention.

With reference first to FIG. 1, the system of the present invention includes a vehicle tag 10 which is typically mounted to the windshield or dashboard of an automotive vehicle. The tag 10 is preferably in communication with an electronic control system 12 for the vehicle so that the vehicle tag has access to data maintained by the electronic control system 12. Such access to the control system 12 may be either by wireless communication between the control system 12 and the tag 10, or by a direct connection 14 between a bus 26 of the control system 12 and the tag 10.

Still referring to FIG. 1, the control system 12 is conventional in construction and includes various functional blocks, such as an engine controller 16, a brake controller 18, a transmission controller 20, a body electronics controller 22, as well as other controllers 24.

Although the controllers 16-24 may be electronically connected together in a conventional fashion, many vehicles utilize a control area network (CAN) communication for communicating among the onboard electronics controllers 16-24 as well as other systems. Such data, furthermore, is available on a data bus 26 and thus available to the tag 10. Other data available to the tag 10 from the vehicle electronic control system includes the vehicle type and, in many cases, a direct calculation of fuel economy.

In the conventional fashion, the vehicle tag is also programmed with account data for an account that will be charged road tolls by the electronic toll collection system. Typically, the owner of the account deposits a sum of money against which tolls are deducted until the account is depleted and a new deposit made by the owner. Alternatively, the account owner is simply billed for the tolls incurred.

Figure 2:
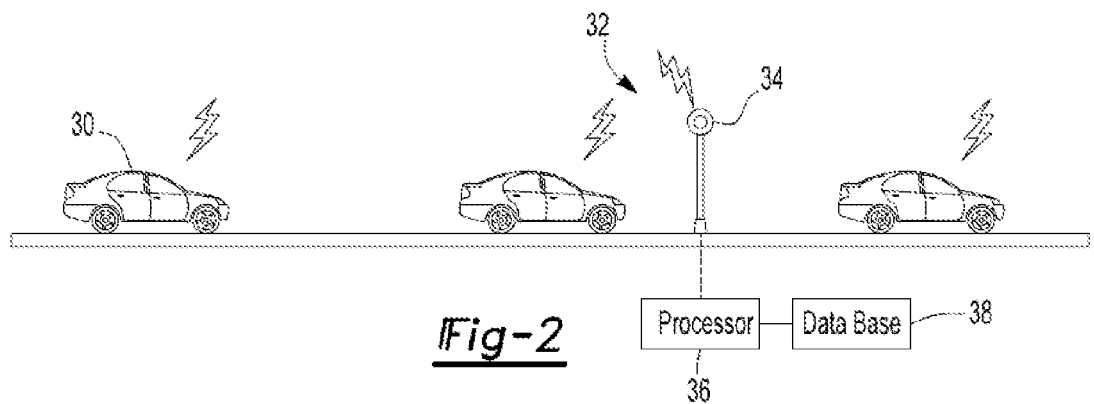
FIG. 2 is a diagrammatic view illustrating the overall operation of the system of the present invention.

With reference now to FIG. 2, the operation of the system of the present invention is there diagrammatically illustrated. A vehicle 30 is shown approaching a toll station 32. The vehicle 30, furthermore, includes the tag 10 mounted to the windshield or dashboard of the vehicle.

As the vehicle 30 approaches the toll station 32, the vehicle tag 10 transmits a wireless signal containing data to a receiver 34 at the toll station 32. Unlike the previously known electronic toll collection systems, however, the data transmitted by the tag 10 to the receiver 34 contains information not only regarding the identity of the account holder, but also information received from the electronic control system 12 of the vehicle relating to fuel consumption for the vehicle, which is directly related to the emission of carbon dioxide. Consequently, as used herein, "fuel consumption" shall include carbon dioxide emission. The data received also contains an identification of the actual vehicle associated with the tag 10.

Figure 3A:
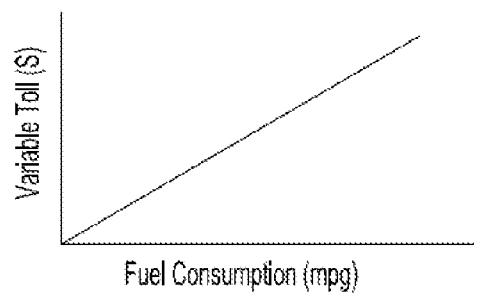
FIGS. 3A and 3B are exemplary graphs illustrating variable toll rates as a function of fuel economy.
Figure 3B:
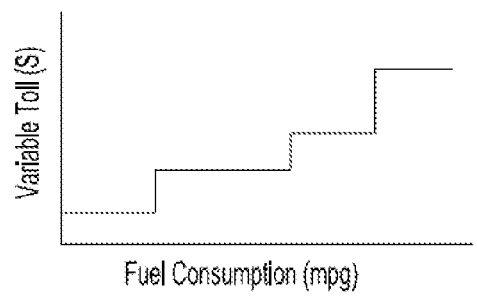

This data is conveyed by the receiver 34 to a processor 36 which computes a toll not only as a function of the type of vehicle 30, but also as a function of the fuel economy or fuel consumption of the vehicle 30. For example, as shown in FIG. 3A, the vehicle toll may vary proportionately as a function of the fuel consumption of the vehicle. Alternatively, the vehicle toll may increase in predefined steps as a function of fuel consumption as shown in FIG. 3B.

After the processor computes the toll, the toll is assessed to the account associated with the tag in a database 38. In the case where the toll is deducted from a deposit previously made by the owner of a particular account, the processor merely deducts the toll from the account in the database 38. Alternatively, the toll is added to the account and the account owner is subsequently billed for the tolls incurred. Consequently, as used in this patent, the term "assess" shall include both adding a toll amount to an account as well as subtracting a toll from an amount contained in an existing account.

Figure 4:
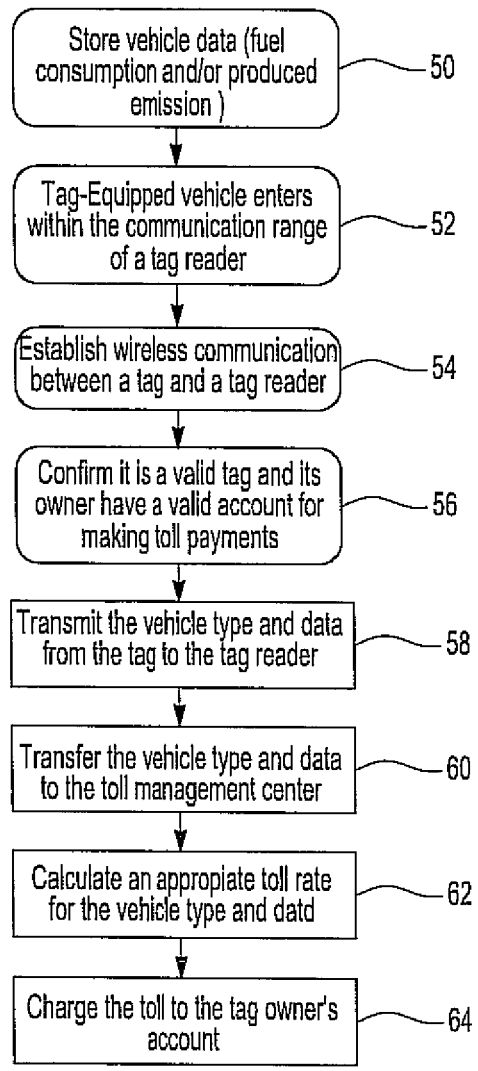
FIG. 4 is a flowchart illustrating the operation of the present invention.

With reference now to FIG. 4, a flowchart illustrating the operation of the present invention is shown. At step 50, a vehicle equipped with a tag 10 enters the communication range of the tag reader or receiver 34. Step 50 then proceeds to step 52. At step 52, wireless communication is established between the tag 10 and tag reader or receiver 34. The processor 36 then determines if the tag 10 is a valid tag and if a valid account exists in the database 38 at step 54. Step 54 then proceeds to step 56.

Assuming that a valid tag has been identified, the tag 10 then transmits the vehicle type from the tag to the receiver 34 at step 56. Step 56 then proceeds to step 58 where the tag 10 transmits the vehicle type and data relating to fuel economy from the tag 10 to the receiver 34. Step 58 then proceeds to step 60. At step 60 the receiver communicates the vehicle type and fuel economy data to the processor 36. The processor proceeds to step 62 where the processor computes an appropriate toll rate as a function not only of the vehicle type, but, optionally, also the fuel economy by using the variable toll step 64. Exemplary variable tolls with respect to FIGS. 3A and 3B. After the appropriate toll has been computed, the processor then proceeds to step 64 where the calculated toll assesses the account in the database 38 to reflect the toll.

From the foregoing, it can be seen that the present invention provides a simple yet effective method and system for assessing vehicle tolls on toll roads as a function not only of the vehicle type, but also as a function of the fuel economy of the vehicle.

Having described my invention, many modifications thereto will become apparent to those skilled in the art to which it pertains without deviation from the spirit of the invention as defined by the scope of the appended claims.

I claim:

1. A system for assessing a toll on a vehicle travelling past a toll station comprising:
   a tag mounted on the vehicle which transmits an output signal having data representative of the fuel consumption of the vehicle and the identity of an account associated with said tag,
   a receiver associated with the toll station which receives said output signal from said tag and provides said data to a processor,
   said processor being programmed to calculate a toll which varies as a function of said data and thereafter assessing said account to reflect said toll,
   wherein said tag receives fuel consumption data from an engine controller of an electronic vehicle control system contained on the vehicle through a CAN network.

2. The system as defined in claim 1 wherein said tag receives said fuel consumption data from said electronic vehicle control system by wireless transmission.

3. The system as defined in claim 1 wherein said processor is programmed to charge tolls which increase with increased fuel consumption.

4. The system as defined in claim 1 wherein said data includes the identification of the type of vehicle.

5. A method for assessing a toll on an account associated to a vehicle comprising the steps of:
   transmitting a signal from a tag mounted on the vehicle to a toll station receiver containing data representative of the fuel consumption of the vehicle and the identity of the account,
   processing said data at said toll station to calculate a toll which varies as a function of said data,
   assessing said account to reflect said toll, and
   wherein said transmitting step further comprises the step of acquiring said data from an engine controller of an engine control system through a CAN network.

6. The method as defined in claim 5 wherein said acquiring step comprises the step of acquiring said data by wireless transmission from the engine control system to said tag.

7. The method as defined in claim 5 wherein said data includes identification of the vehicle.

* * * * *